United States Patent [19]

Tanaka

[11] 4,079,474
[45] Mar. 21, 1978

[54] DRIVING MECHANISM FOR TRANSFER FINGER OF BOLT FORMING HEADER

[75] Inventor: Toshihiro Tanaka, Komatsu, Japan
[73] Assignee: Kabushiki Kaisha Komatsu Seisakusho, Tokyo, Japan
[21] Appl. No.: 779,565
[22] Filed: Mar. 21, 1977
[30] Foreign Application Priority Data
  Mar. 19, 1976 Japan .................. 51-32224
[51] Int. Cl.² ............... B21K 1/44; F16H 53/04
[52] U.S. Cl. ................... 10/12 T; 74/568 R
[58] Field of Search ............... 10/11 T, 12 T, 72 T, 10/76 T; 74/567, 568 R; 192/93 A

[56] References Cited
U.S. PATENT DOCUMENTS

| 2,184,752 | 12/1939 | O'Brien | 10/12 T |
| 2,450,311 | 9/1948 | Strunk et al. | 74/568 R |
| 3,285,095 | 11/1966 | Rockola | 74/568 R |
| 3,839,925 | 10/1974 | Ficken et al. | 74/568 R |
| 3,958,463 | 5/1976 | Block et al. | 74/568 R |

*Primary Examiner*—E. M. Combs
*Attorney, Agent, or Firm*—Armstrong, Nikaido, Marmelstein & Kubovcik

[57] ABSTRACT

A driving mechanism for transfer finger of bolt forming header wherein the phase of cam of the device can be easily variable. The device comprises a base frame, a drive shaft rotatably mounted on said base frame, a cylindrical holder fixedly mounted on said drive shaft, a pair of clutch cylinders mounted on said cylindrical holder, said clutch cylinders having serrations at one end thereof and recessed and ridged portion at the other end thereof, a pair of cams mounted on said cylindrical holder, said cams having serrations engageable with the serrations of said clutch cylinders, and a pair of clutches mounted on said cylindrical holder at both ends thereof, said clutches having recessed and ridged portion engageable with said recessed and ridged portions of said clutch cylinders.

6 Claims, 7 Drawing Figures

DRIVING MECHANISM FOR TRANSFER FINGER OF BOLT FORMING HEADER

BACKGROUND OF THE INVENTION

This invention relates to a driving mechanism for the transfer finger of a bolt forming header.

In the conventional device, a complicated procedure is followed to change the phase of the cams of the device.

For changing the phase of the cams, an operator must loosen the bolts which engage the cams with a drive shaft, then rotate the cams with respect to the drive shaft and finally tighten the bolts to securely fix the cams to the drive shaft.

The above procedure is complicated and time consuming.

SUMMARY OF THE INVENTION

It is, therefore, an object of the present invention to provide a driving mechanism for a transfer finger wherein the phase of the cam for effecting a clamping operation of the transfer finger can be easily changed.

Another object of the present invention is to provide a driving mechanism for transfer finger wherein clamping timing of the transfer finger can be easily adjustable.

According to the present invention there is provided:

a driving mechanism for a transfer finger of a bolt forming header comprising a base frame, a drive shaft rotatably mounted on said base frame, a cylindrical holder fixedly mounted on said drive shaft, a pair of clutch cylinders mounted on said cylindrical holder, said clutch cylinders being rotatable with said cylindrical holder and having serrations at one ends thereof and recessed and ridged portions at the other ends thereof, a pair of cams mounted on said cylindrical holder facing with each other, said cams having serrations adapted to engage with the serrations formed on said clutch cylinders, a pair of clutches mounted on both ends of said cylindrical holder, said clutches having recessed and ridged portions engageable with the recessed and ridged portions of said clutch cylinders, a first lever pivotally mounted about a pin on said base frame, said first lever having a cam follower at one end thereof, and a second lever pivotally mounted about the pin on said base frame, said second lever being provided with said transfer finger at one end thereof.

Other objects, features and advantages of the present invention will be readily apparent from the following description taken in conjunction with the accompanying drawings.

DETAILED DESCRIPTION OF THE PREFERRED EMBODIMENT

A bolt forming header incorporating a drive mechanism of the present invention will now be described with reference to the accompanying drawings.

Figure 1:
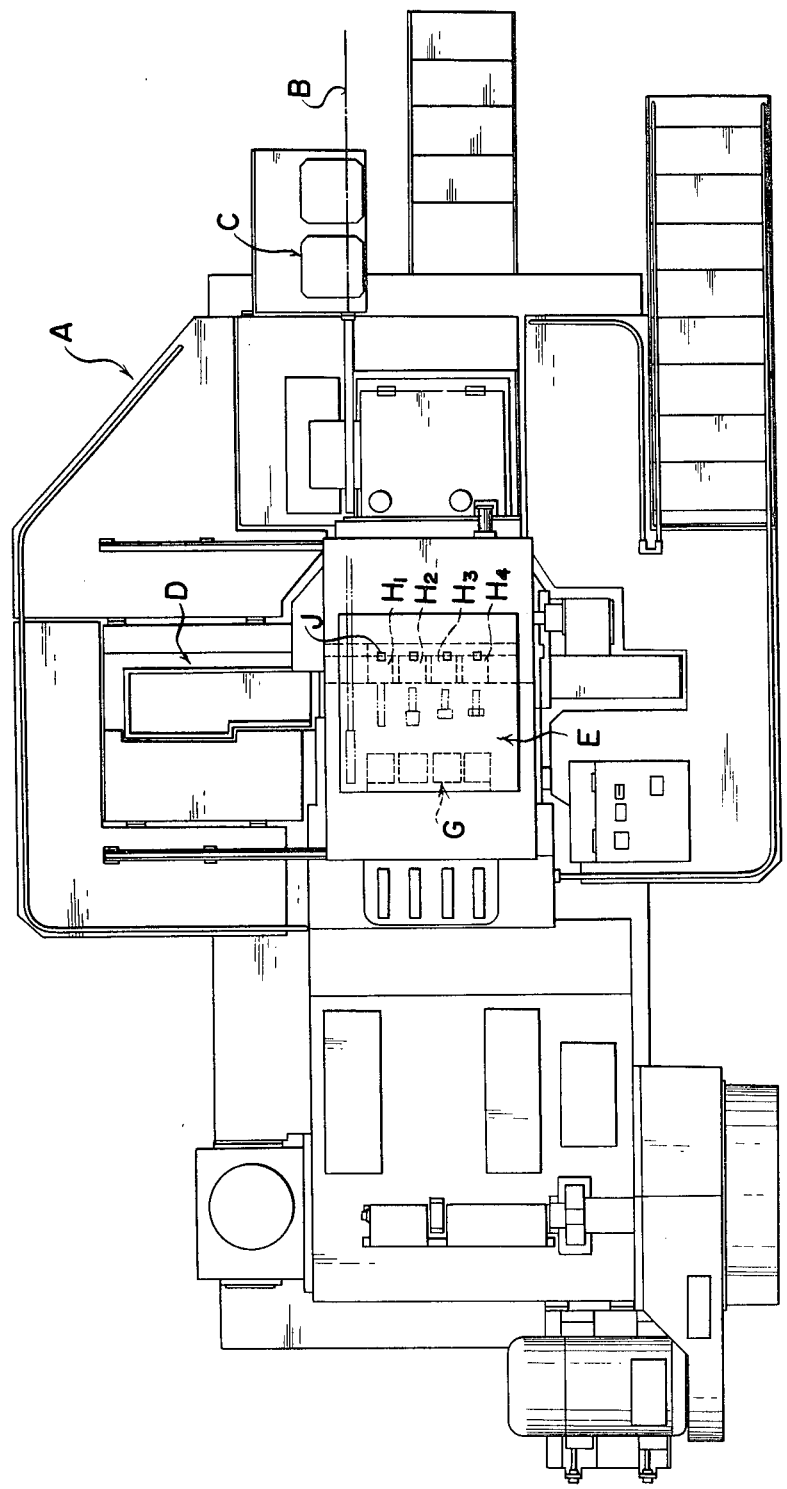
FIG. 1 is a plan view of a bolt forming header employing the driving mechanism for the transfer finger according to the present invention.
Figure 2:
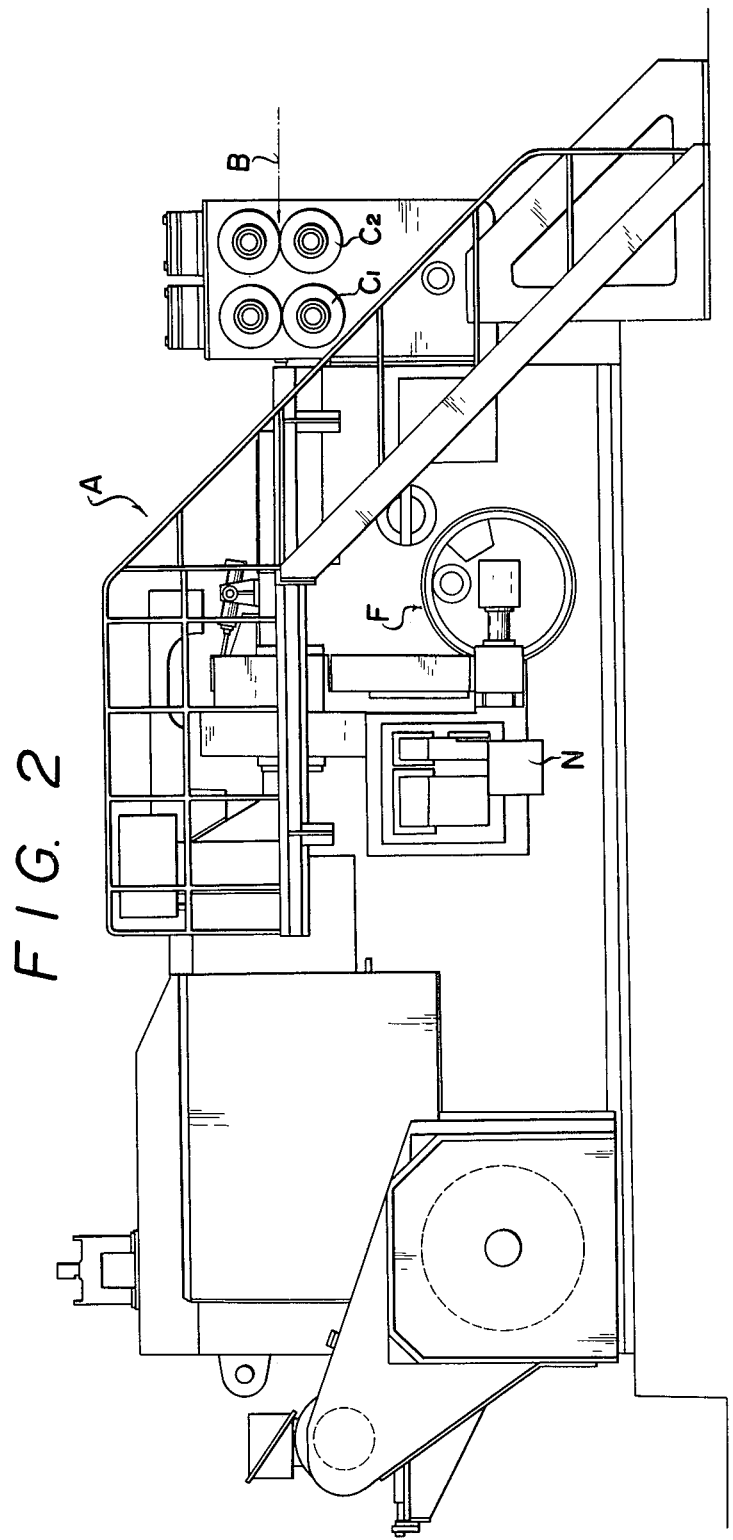
FIG. 2 is a side view of FIG. 1.
Figure 3:
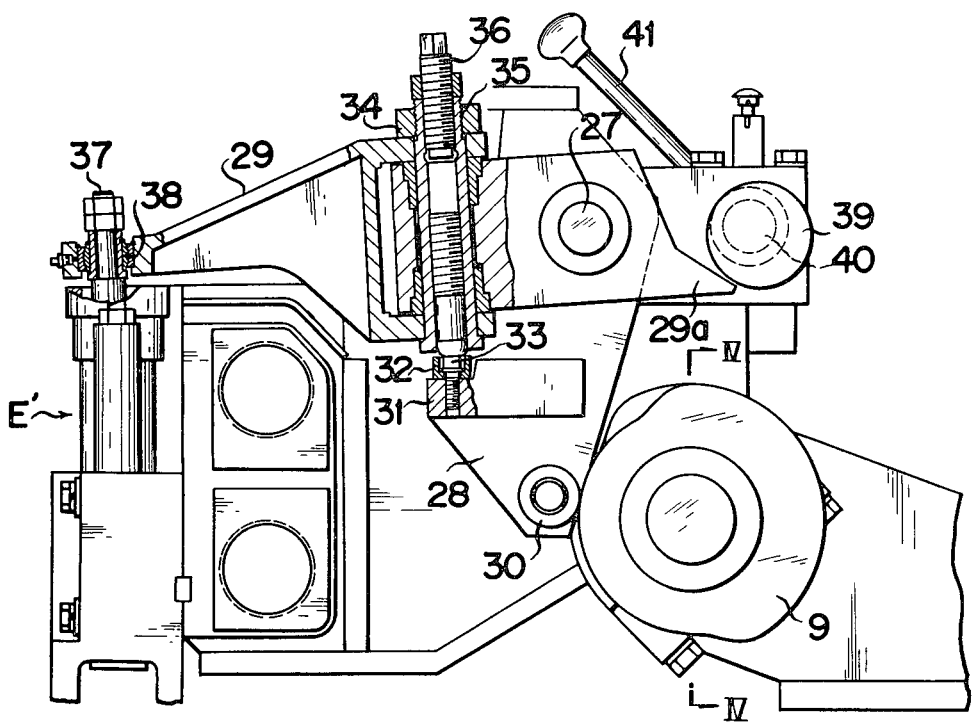
FIG. 3 is a side view partially in cross-section of the driving mechanism of the present invention.
Figure 4:
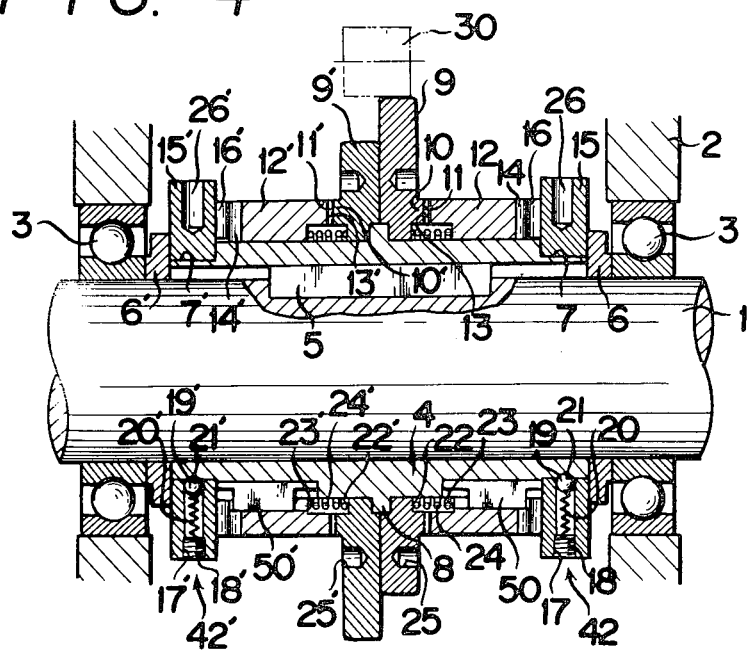
FIG. 4 is a cross-sectional view taken along the line IV—IV of FIG. 3.

In FIGS. 1 and 2, the header is generally indicated at reference character A, and B indicates a coil feed line. The header A includes a wire rod feed unit C, a wire rod cutter unit D, a transfer unit E, and an ejector unit F, and a pressure unit G.

The wire rod feed unit C functions to feed in the wire rod along the line B by intermittently rotating feed rolls $C_1$, $C_2$. The cutter unit D serves to cut off the wire rod to a predetermined length by reciprocating a cutter varying slide member, and then bring a cut blank to a first station $H_1$ of the transfer unit E. The transfer unit serves to transfer the product in process from the first station $H_1$ to the fourth station $H_4$ by means of a chucking unit secured on a transfer carrier. The transfer unit E also provides a transfer finger devide E' for carrying the blank.

Further, the above first to fourth stations $H_1$ to $H_4$ are provided with a cam phase adjustor J. A slide of the pressure unit G incorporates a slide ejector device, and the die ejector unit serves to eject out the product. In the Figures, reference character N indicates an outlet for the product.

The cam phase adjustor J in the transfer finger unit has a shaft 1 to be rotated by a drive source, which shaft 1 is rotatably supported by bearing 3 on the base frame. The shaft 1 mounts therearound a holder 4 keyed at 5 to the shaft. Between the opposite ends of the holder 4 and the bearings 3 are interposed respective spacers 6 and 6'. The holder 4 forms at its opposite ends fitting portions 7 and 7' adapted to fittably mount respective clutches 15 and 15' while forming a flange 8 in its middle. On the holder 4 are mounted opposing cams 9 and 9' for rotation, which cams respectively form annular projections 10 and 10'. The projections 10 and 10' provide serrations 11 and 11', respectively. Further, the holder 4 is applied thereon with clutch cylinders 12 and 12' keyed at 50 and 50' respectively to the holder. Each clutch cylinder 12 or 12' forms at one end adjacent the cam 9 or 9'a serration 13 of 13' while at the other end forming recessed and ridged portions 14 or 14'. The clutches 15 and 15' fitted on the portions 7 and 7', respectively, of the holder 4 are also formed with respective recessed and ridged portions 16 and 16' which are in engagement with the corresponding recessed and ridged portions 14 and 14' of the clutch cylinders 12 and 12'. The clutches 15 and 15' are formed with holes 17 and 17' respectively in which detent means 42 and 42' are disposed. The detent means 42 and 42' respectively include stoppers 18 and 18', balls 19 and 19', and biasing springs 20 and 20 disposed therebetween. The balls 19 and 19' are in fittable engagement with recesses 21 and 21' formed on the fitting portions 7 and 7' of the holder 4.

Figure 5:
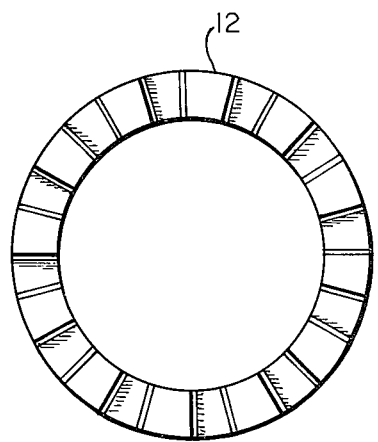
FIG. 5 is an end view of the recessed and ridged portions of a clutch cylinder.

FIG. 5 illustrates an end view of the clutch cylinder 12 showing the recessed and ridged portions 14. An end view of the recessed and ridged portion 16 of clutch 15 would look identical to the recessed and ridged portions illustrated in FIG. 5.

Figure 6A:
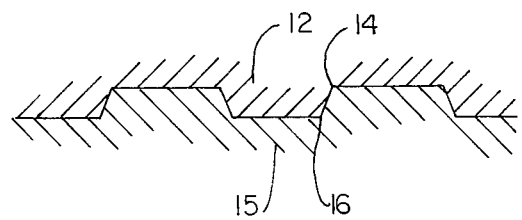
FIGS. 6A and 6B are plan views of the clutch and clutch cylinder recessed and ridged portions in their engaged and disengaged relationships, respectively.
Figure 6B:
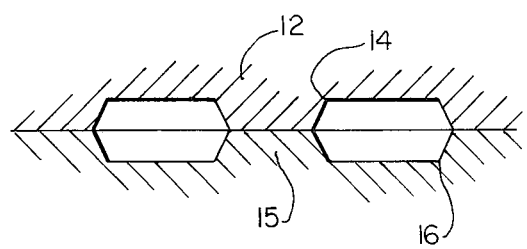

FIGS. 6A and 6B show the recessed and ridged portions 14 and 15 of the clutch cylinder and clutch 12 and 15 in their engaged and disengaged positions, respectively.

As defined by the above described cams 9, 9' and clutch cylinders 12, 12', there are provided spring seat portions 22, 22' and 23, 23' so that springs respectively be disposed therebetween.

The cams 9, 9' and clutches 15, 15' provide holes 25, 25' and 26, 26', respectively, for the mounting of jigs.

The base frame 2 mounts a pin 27 about which a lever 28 and a further lever 29 are pivotable. The first lever 28 mounts a cam follower 30 which cam follower 30 has sufficient breadth to attain contact with both of the cams 9 and 9'. The lever 28 is provided with a support portion 31 in which a support member 32 is secured by a bolt 33.

The second lever 29 is formed with a mounting hole 34 having a sleeve 35 inserted therein, which sleeve 35 in turn has a set screw 36 in threaded engagement. This lever 29 is connected through a bearing 38 to a pull rod 37 for actuating the transfer finger. On the base frame 2 is journaled a cam 39 having its shaft 40 secured to a handle 41, which cam 39 being in engagement with the rear end of the second lever 29.

Further, the earlier described clutch cylinders 12 and 12' provide graduations on the outer surface.

The mode of operation according to the present invention will now be described.

As the shaft 1 rotates, the cams 9, 9' rotate to swing the lever 28 by way of the cam follower 30. The upward directed movement of the lever 28 causes the support member 32 to lift the set screw 36 so that the lever 29 is raised.

Through the downward movement of the lever 28, on the other hand, the lever 29 is moved in the downward direction by a spring (not shown) in the transfer finger unit E.

The upward movement of the lever 29 brings the closed finger to the open position.

When adjusting the cam phase, the clutch 15 with a jig applied in the hole 26 is rotated so that the ridges formed on the portion 16 of the clutch 15 be in registry with the recesses formed on the portion 14 of the clutch cylinder 12 so as to move the clutch cylinder 12 into close mating engagement with the clutch 15 under the biasing force of the spring 24. In consequence, the serration 13 of the clutch cylinder 12 is disengaged from the serration 11 of the cam 9. Then, the cam is turned by a jig being applied in the hole 25 until the cam assumes a desired position of phase. Thereupon, the clutch is again rotated to bring the ridges on its portion 16 in engagement with the ridges on the portion 14 of the clutch cylinder 12, so that the clutch cylinder 12 is moved sgainst the biasing force of the spring 24 to bring the serration 13 in engagement with the serration 11 of the cam 9.

It is to be noted that for phase adjustment of the cam 9', too, the same procesure just described will apply.

I claim:
1. A driving mechanism for a transfer finger of a bolt forming header comprising:
   a base frame;
   a drive shaft rotatably mounted on said base frame;
   a cylindrical holder fixedly mounted on said drive shaft;
   a pair of clutch cylinders mounted on said cylindrical holder, said clutch cylinders being rotatable with said cylindrical holder and each having serrations at one end thereof and recessed and ridged portions at the other ends thereof;
   a pair of cams mounted on said cylindrical holder having abutting faces, said cams having serrations adapted to engage with the serrations formed on said clutch cylinders;
   a pair of clutches mounted on both ends of said cylindrical holder, said clutches having recessed and ridged portions engageable with the recessed and ridged portions of said clutch cylinders, said pair of clutches being drivenly coupled to said drive shaft for rotation therewith, wherein in a first position said recessed and ridged portions of said pair of clutch cylinders are matingly engaged with said recessed and ridged portions of said pair of clutches and said clutch cylinders drive said pair of cams, and in a second position said recessed and ridged portions of said pair of clutch cylinders are out of mating engagement with said recessed and ridged portions of said pairs of clutches and said pair of cams are free for relative rotation;
   a first lever pivotally mounted about a pin on said base frame, said first lever having a cam follower at one end thereof, said cam follower following the profile of said pair of cams and thereby causing pivotal movement of said first lever; and
   a second lever pivotally mounted about the pin and being pivoted by operative engagement with said first lever, said second lever being provided with said transfer finger at one end thereof.

2. A driving mechanism for transfer finger of claim 1 wherein said clutch includes detent means for holding the engagement of the clutch cylinder with said cam.

3. A driving mechanism for transfer finger of claim 2 wherein said detent means comprises a ball, a stoper and a spring disposed therebetween.

4. A driving mechanism for transfer finger of claim 1 wherein spring means is disposed between said cam and said clutch cylinder so as to urge the latter to separate from the former.

5. A driving mechanism for transfer finger of claim 1 wherein holes are formed on said cams and clutches so as to receive jigs therein.

6. A driving mechanism for transfer finger of claim 5 wherein phase of said cams can be varied by rotating one of said cams with respect to the other.

* * * * *